United States Patent
Charkov et al.

(10) Patent No.: US 10,089,702 B2
(45) Date of Patent: Oct. 2, 2018

(54) LOCATION BASED RANKING OF REAL WORLD LOCATIONS

(71) Applicant: Airbnb, Inc., San Francisco, CA (US)

(72) Inventors: Maxim Charkov, San Francisco, CA (US); Jan Overgoor, Berkeley, CA (US)

(73) Assignee: Airbnb, Inc., San Francisco, CA (US)

( * ) Notice: Subject to any disclaimer, the term of this patent is extended or adjusted under 35 U.S.C. 154(b) by 105 days.

(21) Appl. No.: 14/193,995

(22) Filed: Feb. 28, 2014

(65) Prior Publication Data

US 2015/0206258 A1 Jul. 23, 2015

Related U.S. Application Data

(60) Provisional application No. 61/928,846, filed on Jan. 17, 2014.

(51) Int. Cl.
*G06Q 30/00* (2012.01)
*G06Q 50/14* (2012.01)
*G06Q 30/06* (2012.01)

(52) U.S. Cl.
CPC ......... *G06Q 50/14* (2013.01); *G06Q 30/0629* (2013.01)

(58) Field of Classification Search
CPC .. G06Q 30/601–30/0645; G06Q 30/08; G06Q 30/0629; G06Q 50/14
USPC .......... 705/26.1–27.2, 26.64, 26, 27
See application file for complete search history.

(56) References Cited

U.S. PATENT DOCUMENTS

| | | | | |
|---|---|---|---|---|
| 8,315,892 B2* | 11/2012 | Gabriel | ............... | G06Q 10/10 705/5 |
| 2004/0267567 A1* | 12/2004 | Barrera | ............... | G06Q 10/02 705/2 |
| 2006/0149586 A1* | 7/2006 | Brown | ............... | G06Q 10/0637 235/382 |
| 2009/0271281 A1* | 10/2009 | Kang | ............... | G06F 17/30398 705/26.1 |
| 2010/0241647 A1* | 9/2010 | Ntoulas | ............ | G06F 17/30528 707/765 |

OTHER PUBLICATIONS

Anonymous: "Maponics; Maponics Surpasses 300,000 Neighborhood and Subdivision Boundaries," Computers, Networks & Communications [Atlanta] Aug. 11, 2011: 437; ProQuest Dialog # 880821547, 4pgs.*

(Continued)

*Primary Examiner* — Robert M Pond
(74) *Attorney, Agent, or Firm* — Fenwick & West LLP

(57) ABSTRACT

An online booking system allows users to create, search, and book listings of goods or services. When a user searches for listings, the listings are ranked at least in part based on a location relevance score including at least one of a city relevance subscore, a neighborhood subscore, and a distance subscore. Generally, the city relevance subscore quantifies the probability that a searching user may have actually intended to look for listings in a city other than the city specified in a search query. Generally, the neighborhood relevance subscore quantifies the popularity of specific neighborhoods within a city as a replacement or addition to the distance subscore that determines a real world distance between a listing's real world location and a location specified in a search query.

32 Claims, 3 Drawing Sheets

(56) References Cited

OTHER PUBLICATIONS

Anonymous: "Maponics; Online Local Search Heavyweight DexKnows. com Goes Ultra-Local with Maponics Neighborhoods," Telecommunications Weekly [Atlanta] Sep. 30, 2009; ProQuest Dialog #217330578, 4pgs.*

Anonymous: "DataSphere Technologies; DataSphere Technologies to Use Maponics Neighborhood Boundary Data," Technology & Business Journal [Atlanta] Jul. 5, 2011: 392; ProQuest Dialog #874246457, 3pgs.*

PCT International Search Report and Written Opinion, PCT Application No. PCT/US15/11382, dated Apr. 17, 2015, 11 pages.

Singapore Written Opinion, Singapore Application No. 11201605807Q, dated Jun. 29, 2017, 8 pages.

* cited by examiner

LOCATION BASED RANKING OF REAL WORLD LOCATIONS

CROSS REFERENCE TO RELATED APPLICATION(S)

This application claims the benefit of U.S. Provisional Patent Application Ser. No. 61/928,846, filed Jan. 17, 2014, the contents of which are incorporated herein by reference.

BACKGROUND

Many online computer systems offer listings of goods and services for sale, rent, and reservation (for simplicity, "booking" generally) that have or are associated with real world locations that have intangible value to the prospective consumer. For example, in a given city, certain neighborhoods, and even particular streets are more desirable than others. A consumer factors the location into their decision whether to book a listing. Existing online computer systems that provide bookings rank listings using location, for example, using a radial distance between a given listing and the designated center of a city, or a reference point, such as a tourist attraction, as one consideration in the ranking. While the exact ranking mechanism used by these systems varies, however, incorporating location based strictly on radial distance from fixed reference points into a ranking system carries with it the risk of over or underweighting the location of the booking relative to every other factor in the ranking.

Online accommodations and reservations systems provide a suitable example. Typically, the distance between a listing and a user's location is a factor in ranking listings, and these systems generally sort listing from closest to the user to furthest. For example, a user may decide that four miles for a restaurant reservation is a reasonable distance to travel, but fifty miles is unreasonable. However, if two listings are merely a mile apart, then distance becomes much less predictive of whether a prospective user will book one listing over another. As cities are often on the scale few miles, often mere distance is not a useful distinguishing factor in rankings of listings.

SUMMARY

An online booking system allows users to create listings of goods or services, search listings created by other users, and book listings of interest to them. The online booking system includes a search function that, responsive to a search query, ranks listings at least in part based on location relevance scores. The location relevance score of a listing is based on the listing's location, and a location specified in the search query. In various embodiments, the location relevance score includes at least one of a city relevance subscore, a neighborhood subscore, and a distance subscore. Generally, the city relevance subscore quantifies the probability that a searching user actually intended to search for listings in a city other than the city specified in a search query. Generally, the neighborhood relevance subscore quantifies the popularity of specific neighborhoods within a city to determine the probability a searching user will book in a listing's neighborhood. Generally, the distance relevance subscore determines a distance between a listing's location and a location specified in a search query.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

System Overview

Figure 1:
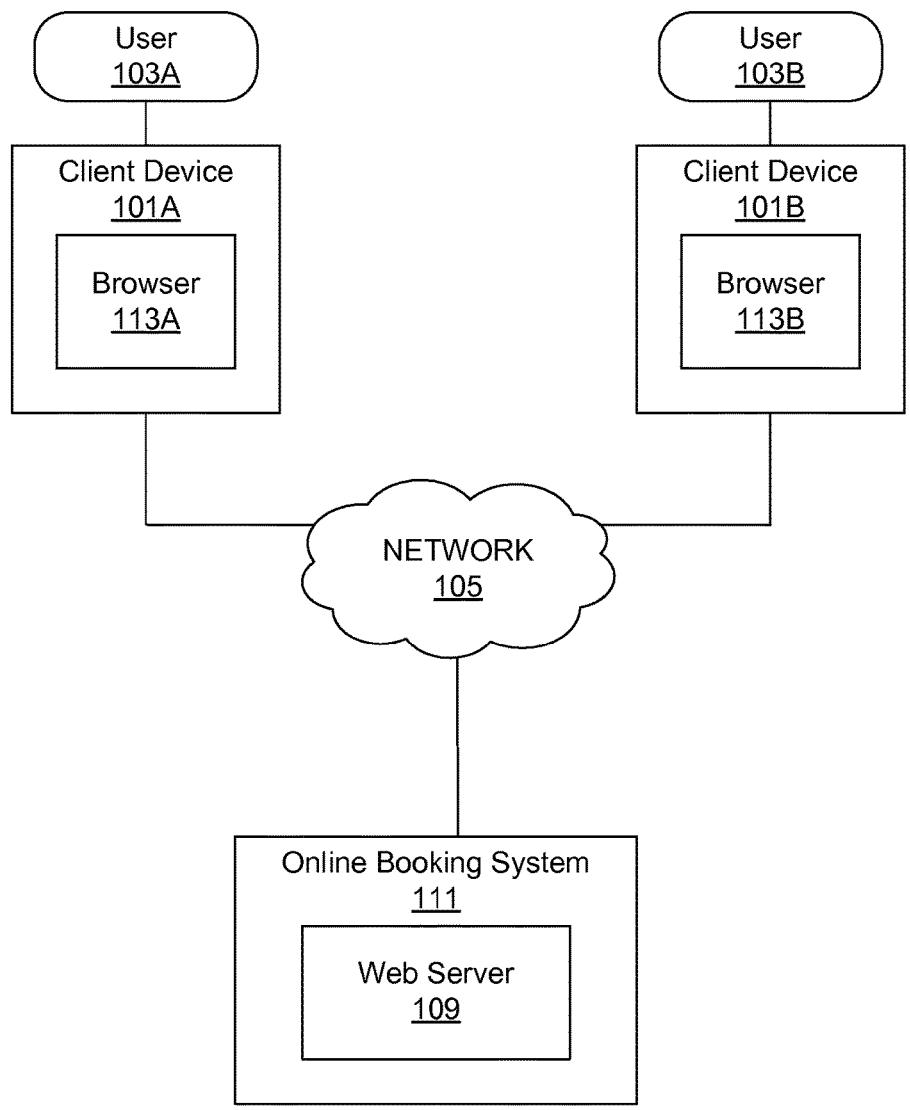
FIG. 1 is a block diagram of a computing environment for an online booking system that ranks listings of goods or services using a location relevance score, according to one embodiment.

FIG. 1 is a block diagram of a computing environment for an online booking system that ranks listings of goods or services using a location relevance score, according to one embodiment. FIG. 1 and the other figures use like reference numerals to identify like elements. A letter after a reference numeral, such as "113A," indicates that the text refers specifically to the element having that particular reference numeral. A reference numeral in the text without a following letter, such as "113," refers to any or all of the elements in the figures bearing that reference numeral (e.g. "113" in the text refers to reference numerals "113A" and/or "113B" in the figures).

The network 105 represents the communication pathways between users 103 (e.g., consumers) and the online booking system 111. In one embodiment, the network is the Internet. The network can also utilize dedicated or private communication links (e.g. WAN, MAN, or LAN) that are not necessarily part of the Internet. The network uses standard communications technologies and/or protocols.

The client devices 101 are used by the users 103 for interacting with the online booking system 111. A client device 101 can be any device that is or incorporates a computer such as a personal computer (PC), a desktop computer, a laptop computer, a notebook, a smartphone, or the like. A computer is a device having one or more general or special purpose processors, memory, storage, and networking components (either wired or wireless). The device executes an operating system, for example, a Microsoft Windows-compatible operating system (OS), Apple OS X or iOS, a Linux distribution, or Google's Android OS. In some embodiments, the client device 101 may use a web browser 113, such as Microsoft Internet Explorer, Mozilla Firefox, Google Chrome, Apple Safari and/or Opera, as an interface to interact with the online booking system 111. In other embodiment, the client device 101 can execute a dedicated application for accessing the online booking system 111.

The online booking system 111 includes web server 109 that presents web pages or other web content, which form the basic interface to the users 103. Users 103 use respective client devices 101 to access one or more web pages, and provide data to the online booking system 111.

The online booking system 111 may be for example an accommodation reservation system, a dining reservation system, a rideshare reservation system, a retail system, and the like. More generally, the online booking system 111 provides users with access to an inventory of resources (e.g. goods and services) that are available to consumers, and for which the real world, physical location of the resource is considered as an intangible factor in the consumer's decision to consume (e.g., purchase, rent, or otherwise obtain) the resource. Generally, resources available at some locations are more desirable than otherwise identical resources available at other locations. Resources include accommodations; restaurants; vehicles; attractions (e.g., shows, events, tourists attractions); shopping centers; and the like. For example, in an online booking system 111 that provides accommodations, accommodations in particular neighborhoods may be more or less desirable than otherwise identical accommodations in some neighborhood: a given neighborhood may be considered more interesting, more prestigious, safer, or have some other quality that consumers deem valuable when selecting accommodations.

In some embodiments, the online booking system 111 facilitates transactions between users 103. For example, an accommodation reservation system allows users 103 to book accommodations provided by other users of the accommodation reservation system. A rideshare reservation system allows users 103 to book rides from one location to another. An online market place system allows users 103 to buy and/or sell goods or services face to face with other users. The online booking system 111 comprises additional components and modules that are described below.

Online Booking System Overview

Figure 2:
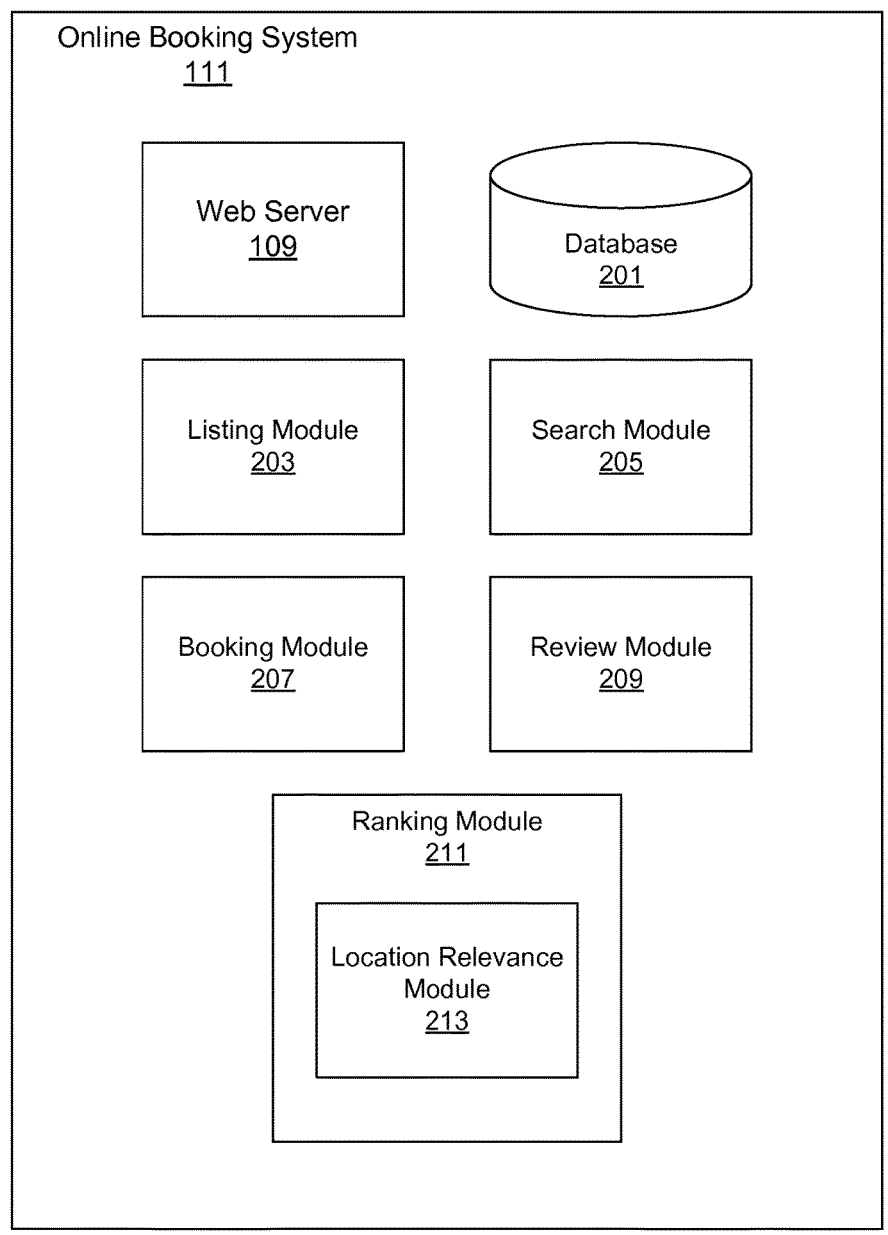
FIG. 2 is a block diagram of an online booking system that ranks listings of goods or services using a location relevance score, according to one embodiment.

FIG. 2 is a block diagram of an online booking system that ranks listings of goods or services using a location relevance score, according to one embodiment. The online booking system 111 includes a database 201, a listing module 203, a search module 205, a booking module 207, a review module 209, and a ranking module 211.

Those of skill in the art will appreciate that the online booking system 111 will contain other modules appropriate for its functionality (e.g., social networking, banking, commerce, etc.), but that are not described herein, since they are not directly material to the invention. In addition, conventional elements, such as firewalls, authentication and encryption systems, network management tools, load balancers, and so forth are not shown as they are not material to the invention. The online booking system 111 may be implemented using a single computer, or a network of computers, including cloud-based computer implementations. The computers are preferably server class computers including one or more high-performance computer processors and main memory, and running an operating system such as LINUX or variants thereof. The operations of the system 111 as described herein can be controlled through either hardware or through computer programs installed in non-transitory computer storage and executed by the processors to perform the functions described herein. The database 201 is implemented using non-transitory computer readable storage devices, and suitable database management systems for data access and retrieval. The database 201 is implemented in a database management system, such as a relational database (e.g., MySQL). The online booking system 111 includes other hardware elements necessary for the operations described here, including network interfaces and protocols, input devices for data entry, and output devices for display, printing, or other presentations of data. As will become apparent below, the operations and functions of the online booking system 111 are sufficiently complex as to require an their implementation on a computer system, and cannot be performed as a practical matter in the human mind.

The listing module 203 provides a user interface and processing logic for users to list goods or services for purchase or rent to other users, and is one means for doing so. For example, if the online booking system 111 is an accommodation reservation system, then the listing module 203 provides a user interface suitable for listing accommodations, such as houses, apartments, condominiums, rooms, treehouses, castles, tents, couches, and sleeping spaces. If the online booking system 111 is a dining reservation system, then the listing module 203 provides a user interface for listing available reservations at restaurants, entertainment venues, resorts, etc. If the online booking system is a rideshare reservation system, then the listing module 203 provides a user interface for listing available rides.

The listing module 203 is configured to receive a listing from a user describing the good or service being offered, a time frame of its availability, a price, a location, and other relevant factors. For example, for an accommodation reservation system, a listing includes a type of accommodation (e.g. house, apartment, room, sleeping space, other), a representation of its size (e.g., square footage, or number of rooms), the dates that the good or service is available, and a rental rate (e.g., per night, week, month, etc.). The listing module 203 allows the user to include additional information about the good or service including photographs and other media. The location information for a listing provides specific reference to a physical location or area in the real world, and may include a country, state, city, and neighborhood of the listing, geographical coordinates, mailing addresses, or other suitable location specifying information. The listing module 203 is also capable of converting one type of location information (e.g., mailing address) into another type of location information (e.g., country, state, city, and neighborhood) using externally available geographical map information. Listings created using the listing user interface are processed by the online booking system 111 and stored in the database 201.

In some online booking systems 111, some listings are temporary, are available for booking one time only, and/or are capable of being deleted by the listing user. The listing module 203 stores these historical, unavailable listings in database 201. The online booking system 111 uses these historical listings to analyze the behaviors of users in creating, searching, ranking, and booking listings. Historical listings may be encrypted or otherwise protected so that they are not available to anyone other than the operator of the listing system.

The booking module 207 provides a user interface and processing logic for users to view and book listings created by other users. The booking module 207 receives payment information from booking users, and securely transmits the payments to listing users. Any user information transmitted as part of the purchase processed is encrypted for user privacy and protection. Upon completion of a booking, the booking is encrypted and stored as historical booking information in database 201.

The review module 209 provides a user interface and processing logic to receive reviews of the listings offered by other users, providing evaluations, feedback, and other commentary about a listing, and is one means for doing so. Completed reviews be included within and appear alongside listings, so that future users interested in booking the listing can evaluate the listing with the reviews in mind. Reviews are stored alongside their associated listings in the database 201. Similarly to historical listings, reviews for historical listings may continue be stored in database 201 after the listing is no longer available.

The search module 205 provides a user interface and processing logic for searching the database for listings responsive to a search query, and is one means for doing so. The user interface of the search module 205 is configured to receive a search query specifying various attributes of a desired good or service, such as type, location, price, and so forth. The search module matches the attributes of the search query to listings in the database 201, ranks the listings using the ranking module 211, and provides the ranked set of listings to a client device, so that the user of the client device can access the listings in a convenient manner. The user interface of the search module 205 is capable of displaying the ranked set of listings by rank order.

Depending upon the implementation, the user interface for receiving a search query may be simple, allowing for as little as a single text string to be entered as the search query, or it may allow for multiple different kinds of predetermined and/or dynamic input options to be entered in the search query. The user interface provides for specification of a location for inclusion in the search query. The location may be auto-populated with the current location of the client device 101A the user is using to perform the search. Alternatively, the user may manually enter a location in the search query. The may include specification of a country, state (or another regional equivalent such as a province, region, territory, canton, department, county, district, or prefecture), city, neighborhood, or other designation such as geographical coordinates (e.g., longitude, latitude), a street address, and a zip codes.

The ranking module 211 provides processing logic to rank listings that match at least part of the search query, and is one means for doing so. The ranking module 211 receives a set of listings responsive to the search query from the search module 205, ranks the listings, and provides a ranked set of listings back to the search module 205 for display. The ranking module 211 ranks the received listings according to a score. The score may be based on a number of different factors that may vary between different implementations of the online booking system 111. For example, the factors used in an accommodation reservation system may vary from the factors used in a rideshare system, for example. The particular scoring function used is dependent on the nature of the overall system 111 and will thus vary. A suitable scoring function is any scoring function that can be constructed from a combination of the component factors (e.g., a linear combination), and further each component factor can be individually normalized and/or standardized. One factor in the ranking is location relevance score that is based on the real world location of the listing to be ranked and a real world location specified in a received search query. The determination of location relevance score is performed by a location relevance module 213, which is further described below. Other possible factors include, for example, the price of a listing, the number and quality of reviews of the listing provided by other users, the quality of pictures in the list, the number of successful and unsuccessful prior bookings, a reply rate, searching user behavioral signals (like click-through from search to listing view or listing view to booking), whether the listing is associated to the searcher via a social networking system social graph.

The ranking module 211 uses the stored historical search, booking, and listing information in order to rank listings. To facilitate this, the search module 205 and booking modules 207 store search, listing browsing, and booking information in database 201. This historical information is stored on a per user, per web browsing session basis, such that a user's interactions with the online booking system 111 are stored together, including any search queries entered, any listings viewed, and any bookings made. Storing search queries and subsequent bookings together, particularly allows the online booking system 111 to aggregate useful statistics across many different users. For example based on stored historical bookings and historical search queries, the online booking system 111 is capable of determining for a given search query (or portion thereof), what bookings were made by users who entered that search query. The online booking system can also determine the reverse: for a given booking, what search queries were made by users.

In using historical search, booking, and listing information to rank listings, the ranking module 211 may use any historical period. For example, the ranking module 211 may use listings, bookings, and searches that occurred in the last month, last three months, last 6 months, last year, all time, or any period therebetween. Alternatively, the ranking module 211 may use listings, bookings, and searches from particular periods (e.g., that occurred during a particular season such as winter, or that occurred over Thanksgiving weekend, etc.).

In situations in which the systems discussed here collect personal information about users, or may make use of personal information, the users may be provided with an opportunity to control whether programs or features collect or store user information (e.g., whether to maintain historical listings, historical search queries, and historical bookings), or to control whether and/or how to receive content from the online booking system 111 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as an address, city, or neighborhood), so that a particular location of a user cannot be determined. Thus, the user may have control over how information is collected about the user and used by the online booking system 111.

Location Relevance

The location relevance module 213 computes a location relevance score for each of a number of listings to be ranked by the ranking module 211. The location relevance score $R_i$ for a given listing i is determined based on at least one of a city relevance subscore $R_{Ci}$, a neighborhood relevance subscore $R_{Ni}$, and a distance relevance subscore $D_i$. An example formula for the determination of the location relevance score $R_i$ is described below the separate descriptions for the determination of the subscores and $R_{Ci}$, $R_{Ni}$, and $D_i$ that may contribute to the location relevance score $R_i$.

To determine each of these subscores, the location relevance module 213 geocodes the location information from the search query. Geocoding is the process of identifying geographic coordinates associated with the location information. Geocoding generates a query country $Q_{I*}$, a query city $Q_{C*}$, and in some cases a query state $Q_{S*}$ (or another regional equivalent) from the location information. Here, the asterisk * denotes a current search query for which the location relevance module 213 is currently determining the value of the location relevance score $R_i$. This distinguishes versus the query country $Q_I$, query state $Q_S$, and query city $Q_C$ from historical search queries and bookings stored in database 201 that are used in determining the city $R_{Ci}$ and neighborhood relevance subscores $R_{Ni}$.

City Relevance

The city relevance subscore $R_{Ci}$ represents relevance of city $C_i$ to a user who enters a search query including a query city $Q_{C*}$, query country $Q_{I*}$, and (in some cases) query state $Q_{S*}$. While it may seem obvious that if the user entered a query city $Q_{C*}$, they must be interested in that query city specifically, this is not necessarily the case. Often users are aware of the names of major cities only, and they are unaware of smaller cities located in proximity to larger cities. For example, if the query city $Q_{C*}$ was "Santa Cruz," it is not necessarily a given that the user intended to look for listings in Santa Cruz only. For example, the user may only know of "Santa Cruz", and may be unaware of these other nearby cities, such as Aptos and Capitola, which are popular resort towns. This is a very common problem, as users typically know the names of major cities, such as Manhattan, Los Angeles, San Francisco, etc., but not the names of nearby towns and cities, but which users do in fact frequently visit. This city relevance subscore adjusts for this lack of user information about nearby cities by using historical information about which cities users actually booked in for particular search queries. In very broad terms, the more frequently users booked in a given city A, when searching for city B, the more relevant city A is to a search query for city B. The city relevance subscore $R_{Ci}$ precisely quantifies this relevance relationship.

The location relevance module 213 determines a city relevance subscore $R_{Ci}$ for one or more cities *. For a given listing i in listing city $C_i$, the module 213 assigns the city relevance subscore $R_{Ci}$ for city $C_i$ to listing i. To determine the city relevance subscore $R_{Ci}$, the location relevance module 213 uses the query country $Q_{I*}$ and (where applicable) the query state $Q_{S*}$ to uniquely identify the query city $Q_{C*}$, as many different cities around the world share the same name. For example, Springfield Mo. and Springfield, Ill. share the same city name Springfield but are located in different states. Using the geocoded query country $Q_{I*}$ and in some cases the query state $Q_{S*}$ allows for unique identification of the query city $Q_{C*}$.

The location relevance module 213 identifies a set of available listings L within a threshold distance to the query city $Q_{C*}$ (e.g., in kilometers). This includes listings within the query city $Q_{C*}$, and may also include listings in other nearby cities, some of which may be in neighboring states and countries. This may include only currently available listings, or it may also include historical listings that are no longer available. In the following description, L will also refer to total number of listings in this set, as will be apparent from the context. The listings L are obtained from database 201.

The location relevance module 213 subdivides the set of listings L into subsets, one listing subset $L_C$ for each city having listings in the set L. In the following description, $L_C$ will also refer to the total number of listings in each city, as will be apparent from the context. The subset of listings for the query city $Q_{C*}$ is $L_{C*}$. The number of listings in each city $L_C$ and in the set L is useful for normalizing the city relevance subscore to avoid unduly skewing the city relevance subscore $R_{Ci}$ towards large or small cities.

The location relevance module 213 further uses the query country $Q_{I*}$, query state $Q_{S*}$, and query city $Q_{C*}$ to identify historical search queries from database 201 that share the same $Q_I$, $Q_S$, and $Q_C$. Many of the historical search queries will have resulted in historical bookings that occurred subsequent to the user inputting the search query, often during the same web browsing session. However, as above it is not necessarily the case that those prior users ended up booking listings in the same city as the query cities $Q_C$ of their historical search queries. For example, many users searching for "Santa Cruz" as their query city, may end up booking in Aptos, which is nearby.

Using the historical bookings in database 201, the module 213 identifies a total number of bookings $B_Q(C_i)$ in each listing city $C_i$ in which a user ended up booking a listing in after searching using the query city $Q_{C*}$, query country $Q_{I*}$, and query state $Q_{S*}$ (where applicable). The bookings from these cities are also aggregated to determine a total number of historical bookings $B_{QT}$, given the query city $Q_{C*}$, query country $Q_{I*}$, and query state $Q_{S*}$ (also where applicable). For example, a search for "Santa Cruz" may include bookings in Santa Cruz, Aptos, Capitola, and Soquel.

The location relevance module 213 uses the above identified quantities to derive additional quantities. The module 213 identifies the probability P(BQ(Ci)|BQT) a user will book a listing in a city Ci of a listing i, given that they entered a search query containing the query city QC*, query country QI*, and query state QS* (where applicable). This quantity mirrors historically measured behavior, as it may be a common occurrence for users to book in city A after searching for city B. This probability may also be calculated as a percentage/ratio BQ(Ci)/BQT. This quantity expected to be high for most listings where the query city QC* matches the listing city Ci. However, it also expected to be non-zero for many other listing cities Ci that do not match the query city QC*.

The location relevance module 213 also identifies the probability $P(Bq(C_i)|B(C_i))$ a user will book in a city $C_i$ of a listing i, relative to the total number of historical bookings $B(C_i)$ that happened in city $C_i$. This probability may also be calculated as a percentage/ratio of $Bq(C_i)/B(C_i)$. Similarly, this quantity is expected to be high for most listings where the query city $Q_{C*}$ matches the listing city C, and it also expected to be non-zero for many other listing cities C that do not match the query city $Q_{C*}$.

In determining the city relevance subscore $R_{Ci}$, the second probability $P(Bq(C_i)|B(C_i))$ can be used to balance out the first probability from the previous paragraph $P(B_Q(C_i)|B_{QT})$. For example, the first probability $P(B_Q(C_i)|B_{QT})$ quantifies the probability people search for one city (e.g., Santa Cruz, New York City), but end up booking in another city (e.g., Aptos, Newark). Despite their differences as cities (e.g., Aptos being smaller and less known to users than Newark), this probability may, in some instances, be comparable for both Aptos and Newark. The second probability $P(Bq(C_i)|B(C_i))$, however, may distinguish between these two types of cities. For example, as Aptos is one of a few small satellite cities surrounding Santa Cruz, it may be the case that the second probability $P(Bq(C_i)|B(C_i))$ indicates that a significant number of people booking in Aptos search for Santa Cruz. More generally, this indicates Aptos's reliance on Santa Cruz searches for bookings In contrast, the second probability $P(Bq(C_i)|B(C_i))$ may indicate that although many people book in Newark after searching in New York city (as given by the first probability $P(B_Q(C_i)|B_{QT})$), by total count of bookings comparatively few people who book in Newark started by searching for New York city (as given by the second probability $P(Bq(C_i)|B(C_i))$). Thus, although the first probability between two different cities may be comparable (here Aptos and Newark), the second probability may not be. Thus, incorporating both probabilities into the city relevance subscore $R_{Ci}$ provides a more accurate assessment of user knowledge, searching, and booking behavior.

The location relevance module 213 determines the city relevance subscore $R_{Ci}$ for a given listing i in city $C_i$ using at least one of $P(B_Q(C_i)|B_{QT})$, $P(Bq(C_i)|B(C_i))$, $L_c$, and $L_{Ci}/L$. In one general embodiment, the city relevance subscore $R_{Ci}$ is based on $P(B_Q(C_i)|B_{QT})$ and $L_{Ci}$ if the query city $Q_{C*}$ is in the same city as the listing's city $C_i$ (Qc*=$C_i$, $L_{Ci}$=$L_{C*}$) whereas the city relevance is subscore is based on all four of the above values if the query city $Q_{C*}$ is not the same as the listing city $C_i$ (Qc*≠$C_i$, $L_{Ci}$≠$L_{C*}$)

In one specific embodiment, the city relevance subscore $R_{Ci}$ is determined according to:

$$R_{Ci} = \begin{cases} N_i & \text{if } Q_{C*} = C_i \\ W_i N_i & \text{if } Q_{C*} \neq C_i \end{cases}$$

where $N_i$ is given by $$N_i = \frac{P(B_Q(C_i) \mid B_{QT})}{M \cdot (L_{Ci})^{1/f}}$$

where f is a numerical value greater than 1 (e.g., if f=2, 1/f is a square root operation), M is a normalizing score such that M=$\max_i N_i$, and $W_i$ is an additional weighting factor given by:

$$W_i = \left(1 + \left(1 - \left(\frac{L_{Ci}}{L}\right)\right)\right) \cdot P(B_Q(C_i) \mid B(C_i))$$

Generally, the above mentioned embodiments return different values for $R_{Ci}$ depending upon whether the query city $Q_{C*}$ matches the listing's city $C_i$. If they do match, then the listing will have an $R_{Ci}$ value of $N_i$. If they do not match, an additional weighting factor results in an $R_{Ci}$ value modified from $N_i$.

Generally, this additional weighting factor W will have different effects in different circumstances. The weighting factor will generally be larger for smaller cities with listings that are frequently booked subsequent to (e.g., during the same browsing session as) a search using a query city that is another larger, more well known city. Using the example introduced above, if Aptos includes well-regarded listings that are frequently booked after a user searches for Santa Cruz, then the weighting factor for Aptos listings will be relatively higher, ultimately causing $R_{Ci}$ to be higher, thereby causing Aptos listings to be ranked more highly in search results for Santa Cruz than they would be otherwise.

On the other hand, the weighting factor will generally be smaller for larger cities that are not frequently booked subsequent to a search query using another query city For example, if users search for New York and they do not frequently end up booking in cities in New Jersey even though they are just across the Hudson River, the weighting factor for New Jersey listings will be relatively lower, thereby causing $R_{Ci}$ to be lower, thereby causing New Jersey listings to not be ranked as highly compared to listings in New York.

Neighborhood Relevance

Often users are looking to book listings where location is one only representation of the type of place (e.g., general atmosphere) in which they want to book a listing. For example, a restaurant located in a interesting part of town may be more desirable than a restaurant that is isolated from activity off a freeway. The neighborhood relevance subscore $R_{Ni}$ is one way of quantifying the intangible values that distinguish otherwise comparable listings where distance between the user and the listing alone is insufficient. The neighborhood relevance subscore $R_{Ni}$ quantifies these intangible values by using historical information about which neighborhoods users actually booked in, and/or historical information about which neighborhoods listings were/are located in. In very broad terms, in one case the more frequently users booked in a given neighborhood relative to other neighborhoods, the greater the neighborhood relevance subscore $R_{Ni}$ for that neighborhood. Further, the number of listings in a given neighborhood, either by count or relative to the number of listings in other neighborhoods, may be used as a normalizing factor in the relevance subscore $R_{Ni}$ for that neighborhood to avoid biasing towards or against neighborhoods have greater or fewer listings.

The location relevance module 213 determines a neighborhood relevance subscore $R_{Ni}$ for one or more neighborhoods in the query city $Q_{C*}$. For a given listing i in listing neighborhood $N_i$, the module 213 assigns the neighborhood relevance subscore $R_{Ni}$ for neighborhood $N_i$ to listing i.

To determine the neighborhood relevance subscore RNi, the location relevance module 213 uses the query country QI*, query state QS*, and query city QC* to identify a set of available listings in a city LC* containing listing i. This may include only currently available listings, or it may also include historical listings that are no longer available. In the following description, LC will also refer to total number of listings in this set, as will be apparent from the context. The listings LC are obtained from database 201. The location relevance module 213 subdivides the set of listings LC into subsets, one subset of listings LN for each neighborhood in the query city QC*. In the following description, LN will also refer to the total number of listings in each neighborhood, as will be apparent from the context. The location relevance module 213 determines the number of listings in a neighborhood LN by accessing the listings in database 201 to identify the neighborhood in which each listing is located. This information may be have been provided by the listing user. Alternatively, neighborhood information may be accessed or provided by an external source. For example, an exogenously generated database may provide correlations between locations and neighborhoods.

The location relevance module 213 determines the neighborhood relevance subscore $R_{Ni}$ based on at least one of a number of listings $L_N$ in the neighborhood $N_i$, a probability $P(B_N(N_i)|B_C)$ of booking a listing $B_N$ in neighborhood $N_i$ relative to the total number of bookings $B_C$ in the city $C_i$, and a probability $P(L_N(N_i)|L_C(C_i))$ of listing i being in neighborhood $N_i$ (given by $L_N(N_i)$) relative to the total number of listings $L_C$ in city $C_i$.

The location relevance module 213 determines the probability $P(B_N(N_i)|B_C(C_i))$ by accessing historical bookings from database 201. The module 213 identifies the total number of historical bookings of listings in each neighborhood $B_N$ separately for each neighborhood in a city, as well as the total number of historical bookings of listings in the city $B_C$ across all included neighborhoods. The probability $P(B_N(N_i)|B_C)$ may also be calculated as a percentage/ratio $B_N(N_i)/B_C(C_i)$.

The location relevance module 213 determines the probability $P(L_N(N_i)|L_C(C_i))$ by accessing currently available and/or historical listings from database 201. The module 213 identifies the total number of listings in each neighborhood $L_N$ in a city, as well as the total number of listings in the city $L_C$ across all included neighborhoods. The probability $P(L_N(N_i)|L_C(C_i))$ may also be calculated as a percentage/ratio $L_N(N_i)/L_C(C_i)$.

In one embodiment, the location relevance module 213 determines the neighborhood relevance subscore $R_{Ni}$ according to:

$$R_{Ni} = \begin{cases} P(B_N(N_i) \mid B_C) & \text{if } Q_{C*} = C_i \\ 0 & \text{if } Q_{C*} \neq C_i \end{cases}$$

Generally, this calculation of the neighborhood relevance subscore $R_{Ni}$ will result in a higher value for listings that are located in neighborhoods in which bookings occur more frequently, and listings appear more often relative, to other neighborhoods in the same city. The increased frequency of listings and bookings for a given neighborhood relative to others is taken indicative of a higher degree of intangible value of that neighborhood to consumers.

Distance Relevance

Generally, the distance relevance subscore $D_i$ quantifies the distance between the location of the search query and the location of a listing, such that listings that are ranked further away are ranked lower using a non-linear function of distance. The reason a non-linear function is used is because greater distances impose more than a simple linear increase in inconvenience or cost to users; in other words, being ten miles away from a desired location is more than simply twice as inconvenient than being five miles away. In one embodiment, this distance d is determined from a center of a query city or neighborhood, as determined by geographical extent or population density. In another embodiment, an external data source may provide the geographical location from which the distance d is determined. In another embodiment, the distance d is measured based on a distance between the listing i and a user's current location, for example as provided by the client device 101 (e.g., a smart phone).

The distance relevance subscore $D_i$ may be a sigmoidal, exponential, stepped, piecewise linear, or any other type of function. In one embodiment, $D_i$ is determined according to $$D_i = \frac{a}{1 + e^{(d/b)-c}}$$

where a is the distance between the location specified in the query, and b, c, and d are configurable constants.

Location Relevance Example

In one embodiment, the location relevance module 213 determines the location relevance score $R_i$ for a listing i is determined according to:

$$R_i = \begin{cases} R_{Ci} \cdot (1 + R_{Ni}) & \text{if } Q_{C*} = C_i \text{ city has neighborhoods} \\ R_{Ci} \cdot (1 + D_i) & \text{if } Q_{C*} = C_i \text{ no neighborhoods} \\ R_{Ci} & \text{if city data available} \\ D_i^2 & \text{if no city data available} \end{cases}$$

where the city relevance subscore $R_{Ci}$, the neighborhood relevance subscore $R_{Ni}$, and the distance relevance subscore $D_i$ are determined as described above. In alternate embodiments, other types of data not mentioned here may be used to determine location relevance score $R_i$ in addition to or in place of the subscores described here.

Determining the location relevance score $R_i$ according to this function allows the location relevance score $R_i$ to vary depending upon the search query and the data available to the online booking system 111. Depending upon the search query, historical listing, booking, and/or querying information about the country, state, city, and/or neighborhoods designated by the search query may not be available to the location relevance module 213. The above formulation of $R_i$ allows the calculation of $R_i$ to accommodate varying levels of information.

If no city or neighborhood data is available, the location relevance score $R_i$ is determined using the distance relevance subscore $D_i$. The rationale of this circumstance is that if no city or neighborhood data is available for the queried country, state, and/or city, then distance may be the only available type of data for determining the location relevance score $R_i$.

If city data is available but no neighborhood data is available, and the query city $Q_{C*}$ does not match the listing city $C_i$, then the location relevance score $R_i$ is determined using the city relevance subscore $R_{Ci}$ but not the distance relevance subscore $D_i$. The rationale of this circumstance is that if a listing is outside (i.e., not equal to) the query city $Q_{C*}$, then the city relevance score $R_{Ci}$ will provide a more accurate representation of the probability of a user booking the listing than the distance relevance subscore will. This circumstance helps ensure that listings that would otherwise be highly ranked by the ranking module 211 are not underranked in the rankings due to their distance from the query city $Q_{C*}$.

If city data is available but no neighborhood data is available, and the query city $Q_{C*}$ matches the listing city $C_i$, then the relevance score $R_i$ is determined using the city relevance subscore $R_{Ci}$ and the distance relevance subscore $D_i$. The rationale of this circumstance is that if the listing is in the query city, it is presumed that the decreased distance between the location in the query and the location of the listing relative to listings located in other cities will result in an increased probability of the user booking this listing relative to listings located in other cities. By design this formulation of the location relevance score $R_i$ will not always exclude listings from outside the query city from appearing in a ranked set of listings, this just gives a boost to listings located in the query city.

If city data and neighborhood data is available, and the query city $Q_{C*}$ matches the listing city $C_i$, then the relevance score $R_i$ is determined using the city relevance subscore $R_{Ci}$ and the neighborhood relevance subscore $R_{Ni}$. The rationale of this circumstance is that it is presumed that the neighborhood information is more likely to provide an accurate assessment of whether or not a particular listing will be booked than distance data will. To that end, this formulation of the relevance score replaces the distance relevance subscore $D_i$ with the neighborhood relevance subscore $R_{Ni}$. In an alternate embodiment, in this circumstance the relevance score $R_i$ is determined using all three subscores $R_{Ci}$, $R_{Ni}$, and $D_i$.

Exemplary Method

Figure 3:
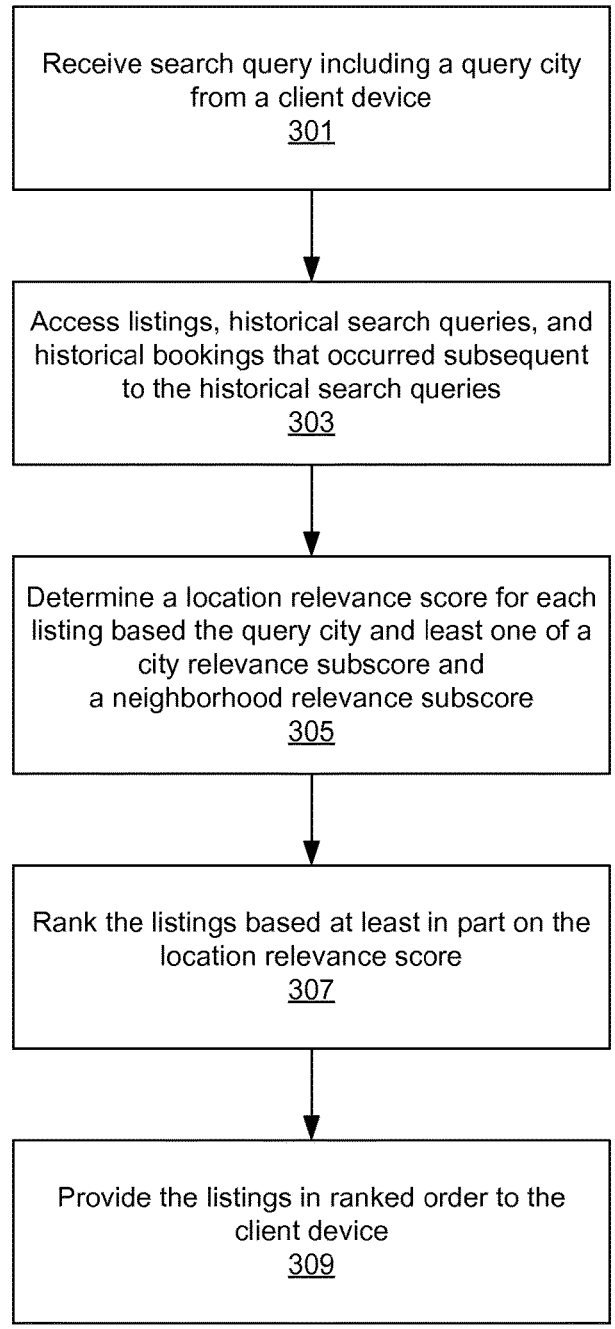
FIG. 3 is a flow chart for ranking listings of goods or services using a location relevance score, according to one embodiment.

FIG. 3 is a flow chart for ranking listings of goods or services using a location relevance score, according to one embodiment. In step 301, the online booking system 111 receives a search query from a client device, where the search query includes at least a query city, and in some cases a query state and query country as well. In step 303, the online booking system 111 accesses a number of stored listings for goods or services, as well as historical search queries and historical bookings that occurred subsequent to the search queries. In step 305, the online booking system 111 determines a location relevance score for each accessed listing. The location relevance score for a listing is based on at least one of a city relevance subscore, a neighborhood relevance subscore, and a distance subscore. In step 307, the online booking system 111 ranks the listings based at least in part on the location relevance score. The rankings may also be based on other factors, for example number of reviews provided by users for a listing, the number of bookings of the listing, the price of listing, and so on. In step 309, the online booking system 111 provides the listings to the client device in ranked order.

The invention claimed is:

1. A computer implemented method for providing listings available for booking to a user based on historical booking information associated with other users, comprising:
    receiving, during a browsing session, a search query from a client device associated with a user, the search query including a query city;
    accessing a plurality of listings available for booking by users, each of the listings located in one of a plurality of listing cities, at least one of the listing cities being different from the query city;
    accessing a plurality of historical search queries including the query city and a plurality of historical bookings in the plurality of listing cities, wherein the plurality of historical search queries are stored and grouped on a per user, per web browsing session basis;
    determining, by a computer processor, a location relevance score for each of the listings based on a city relevance subscore, the city relevance subscore for a listing indicating a probability that the user will book the listing in the listing city given (i) the query city included in the search query and (ii) the historical bookings in the listing city;
    responsive to the listing city being different than the query city, adjusting the city relevance subscore based on a number of historical bookings in the listing city that occurred during a same web browsing session as historical search queries including the query city;
    ranking the listings based at least in part on the city relevance subscore;
    responsive to the search query, providing the listings in ranked order to the client device associated with the user; and
    storing the search query in association with the query city and with the browsing session, the stored search query used to rank the listings responsive to a subsequent search query including the query city.

2. The computer implemented method of claim 1,
    wherein the city relevance subscore for a listing is based on a first function if the query city is the same as the listing city, and
    wherein the city relevance subscore is based on the first function and an additional weighting factor if the query city is different from the listing city, the weighting factor adjusts the city relevance subscore based on the number of historical bookings in the listing city that occurred during the same web browsing session as historical search queries including the query city.

3. The computer implemented method of claim 1, wherein the city relevance subscore for the listing is further based on a total number of historical bookings that occurred during a same web browsing session as historical search queries including the query city.

4. The computer implemented method of claim 1, wherein the city relevance subscore for the listing is based on a number of listings in the listing city.

5. The computer implemented method of claim 1, wherein the city relevance subscore for the listing is based on a number of listings in the listing city and a total number of listings in the plurality of listings.

6. The computer implemented method of claim 1, wherein the historical search queries and the historical bookings are encrypted to prevent the user from viewing private user information associated with the historical search queries and the historical bookings, and wherein the listings are provided in the ranked order without reference to private user information associated with the plurality of historical bookings.

7. The computer implemented method of claim 1, wherein the city relevance subscore of the listing city is further adjusted based on historical bookings of the listing city that were resulted from searching of the listing city.

8. A computer implemented method for providing listings available for booking to a user based on historical booking information associated with other users, comprising:
    receiving, during a browsing session, a search query from a client device associated with user, the search query including a query city;
    accessing a plurality of listings available for booking by users, each of the listings located in one of a plurality of listing neighborhoods in the query city;
    accessing a plurality of historical bookings in the query city, wherein the plurality of historical bookings are stored and grouped on a per user, per web browsing session basis;
    determining, by a computer processor, a location relevance score for each of the listings based on a neighborhood relevance subscore, the neighborhood relevance subscore indicating a probability that the user will book the listing in the listing neighborhood given (i) the query city included in the search query and (ii) historical bookings in the listing neighborhood in the query city;
    adjusting the neighborhood relevance subscore based on a number of historical bookings in the listing neighborhood that occurred during a same web browsing session as a historical search query including the query city;
    ranking the listings based at least in part on the neighborhood relevance subscore;
    responsive to the search query, providing the listings in ranked order to the client device associated with the user; and
    storing the search query in association with the query city and with the browsing session, the stored search query used to rank the listings responsive to a subsequent search query including the query city.

9. The computer implemented method of claim 8, wherein the historical bookings are for listings from a plurality of listing neighborhoods in the query city.

10. The computer implemented method of claim 8, wherein the neighborhood relevance subscore for the listing is based on a number of historical bookings in the listing neighborhood.

11. The computer implemented method of claim 10, wherein the neighborhood relevance subscore for the listing is further based on a total number of historical listings in a listing city of the listing neighborhood.

12. The computer implemented method of claim 8, wherein the neighborhood relevance subscore for a listing is based on a number of available listings in the listing neighborhood.

13. The computer implemented method of claim 12, wherein the neighborhood relevance subscore for a listing is further based on a total number of available listings in a listing city of the listing neighborhood.

14. The computer implemented method of claim 8, further comprising:
    accessing a plurality of historical listings that are no longer available for booking by users, each of the historical listings located in one of the listing neighborhoods in the query city; and wherein the neighborhood relevance subscore for one of the listings is further based on the historical listings.

15. The computer implemented method of claim 8, wherein the historical bookings are encrypted to prevent the user from viewing private user information associated with the historical bookings, and wherein the listings are provided in the ranked order without reference to private user information associated with the plurality of historical bookings.

16. The computer implemented method of claim 8, wherein the neighborhood relevance subscore of the listing city is further adjusted based on historical bookings of the listing neighborhood that were resulted from searching of the listing neighborhood.

17. A non-transitory computer readable medium storing instructions for providing listings available for booking to a user based on historical booking information associated with other users the instructions, when executed by a processor, cause the processor to:
receive, during a browsing session, a search query from a client device associated with a user, the search query including a query city;
access a plurality of listings available for booking by users, each of the listings located in one of a plurality of listing cities, at least one of the listing cities being different from the query city;
access a plurality of historical search queries including the query city and a plurality of historical bookings in the plurality of listing cities, wherein the plurality of encrypted historical search queries are stored and grouped on a per user, per web browsing session basis;
determine, by a computer processor, a location relevance score for each of the listings based on a city relevance subscore, the city relevance subscore for a listing indicating a probability that the user will book the listing in the listing city given (i) the query city included in the search query and (ii) the historical bookings in the listing city;
responsive to the listing city being different than the query city, adjust the city relevance subscore based on a number of historical bookings in the listing city that occurred during a same web browsing session as historical search queries including the query city;
rank the listings based at least in part on the city relevance subscore;
responsive to the search query, provide the listings in ranked order to the client device associated with the user; and
store the search query in association with the query city and with the browsing session, the stored search query used to rank the listings responsive to a subsequent search query including the query city.

18. The computer readable medium of claim 17,
wherein the city relevance subscore for a listing is based on a first function if the query city is the same as the listing city, and
wherein the city relevance subscore is based on the first function and an additional weighting factor if the query city is different from the listing city, the weighting factor adjusts the city relevance subscore based on the number of historical bookings in the listing city that occurred during the same web browsing session as historical search queries including the query city.

19. The computer readable medium of claim 17, wherein the city relevance subscore for the listing is further based on a total number of historical bookings that occurred during a same web browsing session as historical search queries including the query city.

20. The computer readable medium of claim 17, wherein the city relevance subscore for the listing is based on a number of listings in the listing city.

21. The computer readable medium of claim 17, wherein the city relevance subscore for the listing is based on a number of listings in the listing city and a total number of listings in the plurality of listings.

22. The computer readable medium of claim 17, wherein the historical search queries and the historical bookings are encrypted to prevent the user from viewing private user information associated with the historical search queries and the historical bookings, and wherein the listings are provided in the ranked order without reference to private user information associated with the plurality of historical bookings.

23. The computer readable medium of claim 17, wherein the city relevance subscore of the listing city is further adjusted based on historical bookings of the listing city that were resulted from searching of the listing city.

24. A non-transitory computer readable medium storing instructions for providing listings available for booking to a user based on historical booking information associated with other users, the instructions, when executed by a processor, cause the processor to:
receive, during a browsing session, a search query from a client device associated with user, the search query including a query city;
access a plurality of listings available for booking by users, each of the listings located in one of a plurality of listing neighborhoods in the query city;
access a plurality of historical bookings in the query city, wherein the plurality of historical bookings are stored and grouped on a per user, per web browsing session basis;
determine, by a computer processor, a location relevance score for each of the listings based on a neighborhood relevance subscore, the neighborhood relevance subscore indicating a probability that the user will book the listing in the listing neighborhood given (i) the query city included in the search query and (ii) historical bookings in the listing neighborhood in the query city;
adjust the neighborhood relevance subscore based on a number of historical bookings in the listing neighborhood that occurred during a same web browsing session as a historical search query including the query city;
rank the listings based at least in part on the neighborhood relevance subscore;
responsive to the search query, provide the listings in ranked order to the client device associated with the user; and
store the search query in association with the query city and with the browsing session, the stored search query used to rank the listings responsive to a subsequent search query including the query city.

25. The computer readable medium of claim 24, wherein the historical bookings are for listings from a plurality of listing neighborhoods in the query city.

26. The computer readable medium of claim 24, wherein the neighborhood relevance subscore for the listing is based on a number of historical bookings in the listing neighborhood.

27. The computer readable medium of claim 26, wherein the neighborhood relevance subscore for the listing is further based on a total number of historical listings in the listing city of the listing neighborhood.

28. The computer readable medium of claim 24, wherein the neighborhood relevance subscore for a listing is based on a number of available listings in the listing neighborhood.

29. The computer readable medium of claim 28, wherein the neighborhood relevance subscore for a listing is further based on a total number of available listings in the listing city of the listing neighborhood.

30. The computer readable medium of claim 24, wherein the instructions further cause the processor to:
   access a plurality of historical listings that are no longer available for booking by users, each of the historical listings located in one of the listing neighborhoods in the query city; and
   wherein the neighborhood relevance subscore for one of the listings is further based on the historical listings.

31. The computer readable medium of claim 24, wherein the historical bookings are encrypted to prevent the user from viewing private user information associated with the historical bookings, and wherein the listings are provided in the ranked order without reference to private user information associated with the plurality of historical bookings.

32. The computer readable medium of claim 24, wherein the neighborhood relevance subscore of the listing city is further adjusted based on historical bookings of the listing neighborhood that were resulted from searching of the listing neighborhood.

* * * * *